Oct. 21, 1969  M. F. ORR  3,473,622
LOAD RESPONSIVE FRICTIONAL VEHICLE DRIVE TRANSMISSION
Filed Nov. 20, 1967  4 Sheets-Sheet 1

INVENTOR.
MATTHEW F. ORR
BY
Eugene C. Kubloek
ATTORNEY

Oct. 21, 1969            M. F. ORR            3,473,622
LOAD RESPONSIVE FRICTIONAL VEHICLE DRIVE TRANSMISSION
Filed Nov. 20, 1967            4 Sheets-Sheet 2
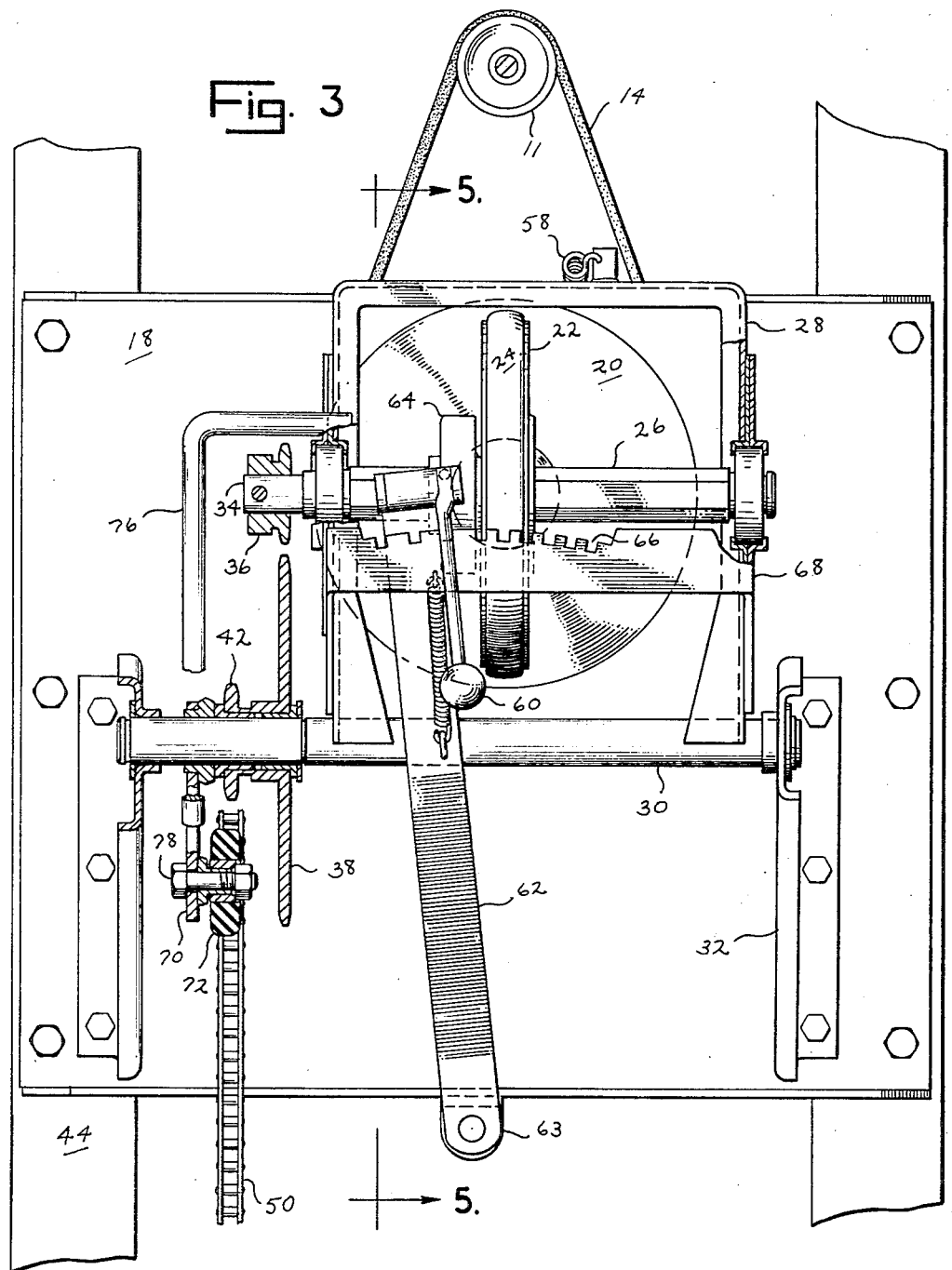
INVENTOR.
MATTHEW F. ORR
BY
Eugene C. Knoblock
ATTORNEY

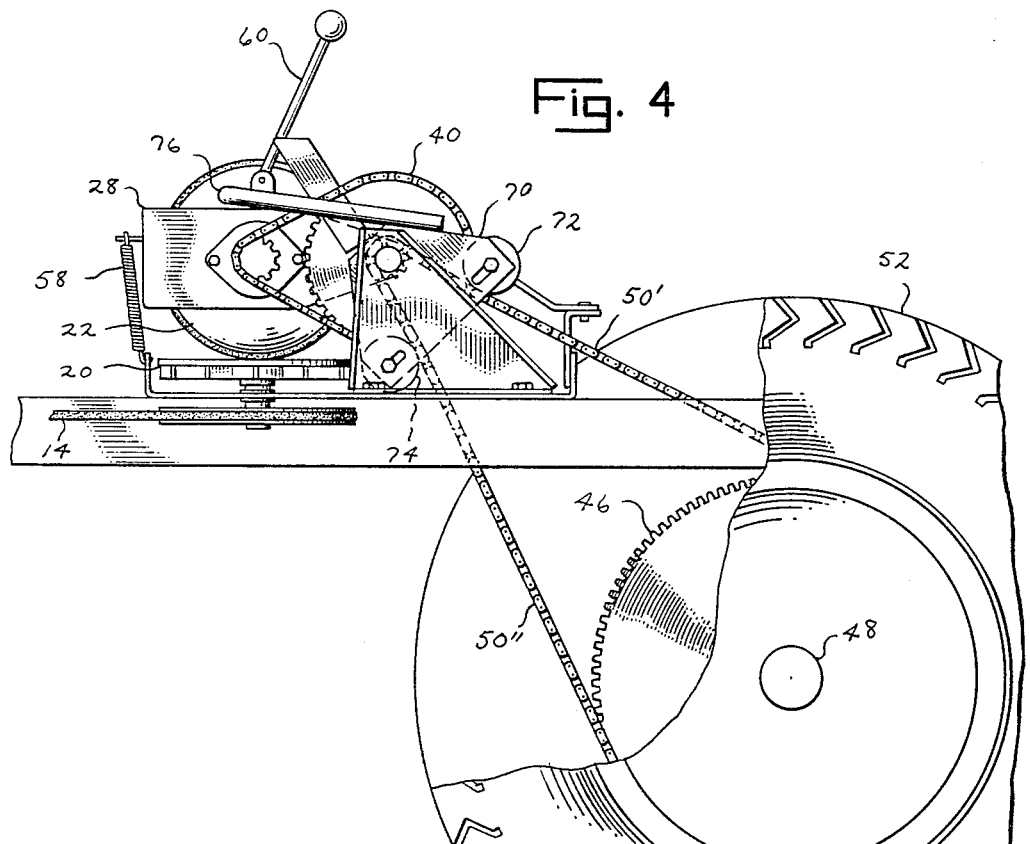

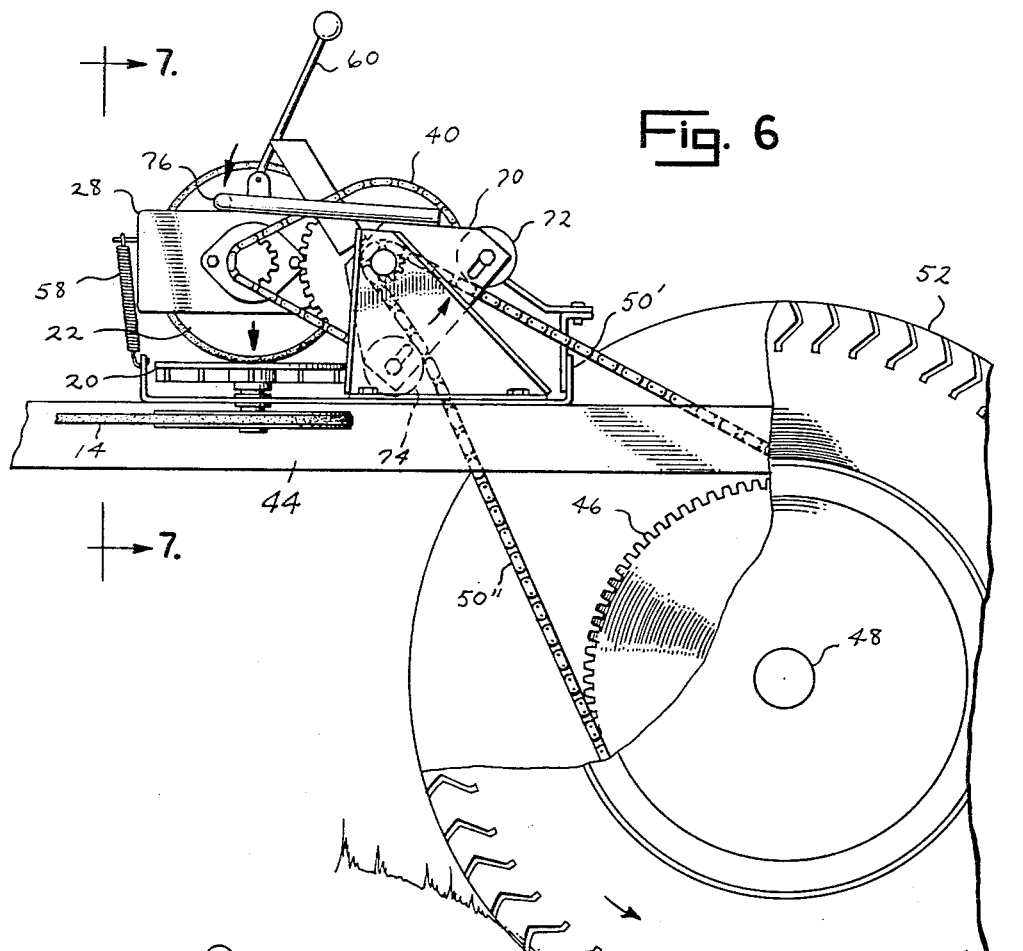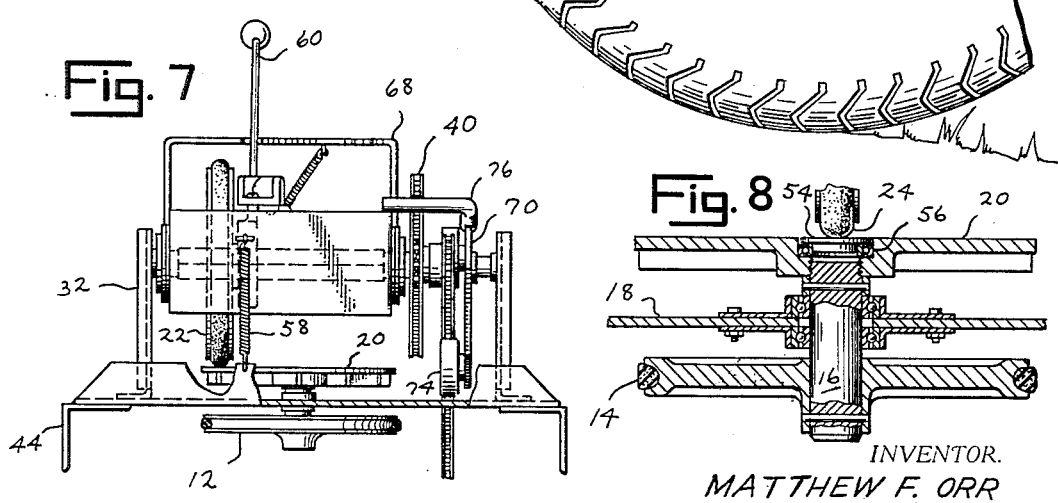

3,473,622
LOAD RESPONSIVE FRICTIONAL VEHICLE DRIVE TRANSMISSION

Matthew Fay Orr, Michigan City, Ind., assignor to Levitt Manufacturing Corp., Michigan City, Ind.
Filed Nov. 20, 1967, Ser. No. 684,125
Int. Cl. B60k 17/00; F16h 15/08
U.S. Cl. 180—70                                    5 Claims

ABSTRACT OF THE DISCLOSURE

A frictional vehicle drive transmission having a friction disk and engaging friction wheel for the transmission of power in which an endless drive from the friction wheel to the vehicle axle has associated with it a pivotal member with two idler wheels engaging the slack and tension runs of the endless drive, causing the member to swing in response to the tension of vehicle drive. Attached to the pivotal member and responsive to the pivotal movements of the idler wheels is an extended structural member which increases the frictional force between the friction disk and the friction wheel.

BACKGROUND OF THE INVENTION

This invention pertains to the field of friction disk and wheel drive transmissions.

Friction type vehicle drive transmissions for small vehicles, such as lawn and garden type tractors commonly employ a power driven disk rotating on one axis and a friction wheel rotating and shiftable on a perpendicular axis and engaging a selected part of the surface of the disk, with a biasing spring or similar device utilized to maintain frictional contact between the wheel and disk during movement of the vehicle. This spring normally produces a selected pressure. During periods of vehicle movement involving increased load upon the vehicle drive, such as when climbing rough terrain, steep grades, and pushing snow or earth, slippage tends to occur between the friction wheel and the disk, thus reducing the amount of power transmitted to the driving wheels and stalling the vehicle. In order to avoid such stalling it has been common practice to increase the biasing spring pressure by a selected amount, thereby increasing the frictional drive transmitting force between the disk and wheel. Although such increase in spring pressure improves the transmission of power to the drive wheels, it also produces detrimental consequences to the vehicle itself. Thus it increases wear of the frictional tire of the wheel, causing a great reduction in the useful life of the frictional wheel tire which wears out in a short time. This increased pressure also causes an undue amount of stress upon the disk and its supporting bearings, causing tilting of the disk and binding of the component parts with resultant bearing wear and failure.

SUMMARY OF THE INVENTION

This invention pertains to an improved load responsive frictional vehicle drive transmission having a horizontal power driven friction disk mounted upon a depending rotating shaft. An adjustable friction wheel is mounted above said friction disk on a pivotal frame and has a frictional tire engaging the upper surface of said friction disk. The friction wheel is adjustable substantially along a diameter of the friction disk. An endless flexible drive means is included in the drive connecting the wheel axis to the friction wheel. A pivotal member which is shifted responsive to variations of the tension of the flexible drive means under load engages the pivotal frame of the friction wheel in a manner to cause a vertical displacement of the friction wheel, thereby varying the friction force between the friction disk and wheel. Thus, this invention utilizes variations of the slack and tension of the flexible drive means to vary the frictional contact pressure between the friction disk and wheel. This increase of frictional pressure is proportional to load increase and continues only as long as the increased loading continues. Thus wear conditions are held to a minimum.

Accordingly, it is a purpose of this invention to minimize the amount of friction wheel wear and friction disk bearing wear in a frictional vehicle drive transmission.

It is another object of this invention to proportionately increase and decrease the amount of frictional force between the friction wheel and friction disk of a frictional vehicle drive transmission in response to varying vehicle load requirements.

Other objects of this invention will become apparent upon a reading of the invention's description.

BRIEF DESCRIPTION OF THE DRAWINGS

A preferred embodiment of this invention has been chosen for the purposes of illustration and description wherein:

FIG. 3 is a fragmentary top plane view of the drive transmission with parts shown in section.

FIG. 4 is a fragmentary side elevational view of the drive transmission in normal operative condition.

FIG. 5 is a longitudinal vertical sectional view of the drive transmission taken along line 5—5 of FIG. 3.

FIG. 6 is a fragmentary side elevational view similar to FIG. 4 showing the vehicle ascending an incline.

FIG. 7 is a partial transverse vertical sectional view taken along line 7—7 of FIG. 6.

FIG. 8 is a vertical sectional detail view taken along line 8—8 of FIG. 5.

DESCRIPTION OF THE PREFERRED EMBODIMENT

Figure 1:
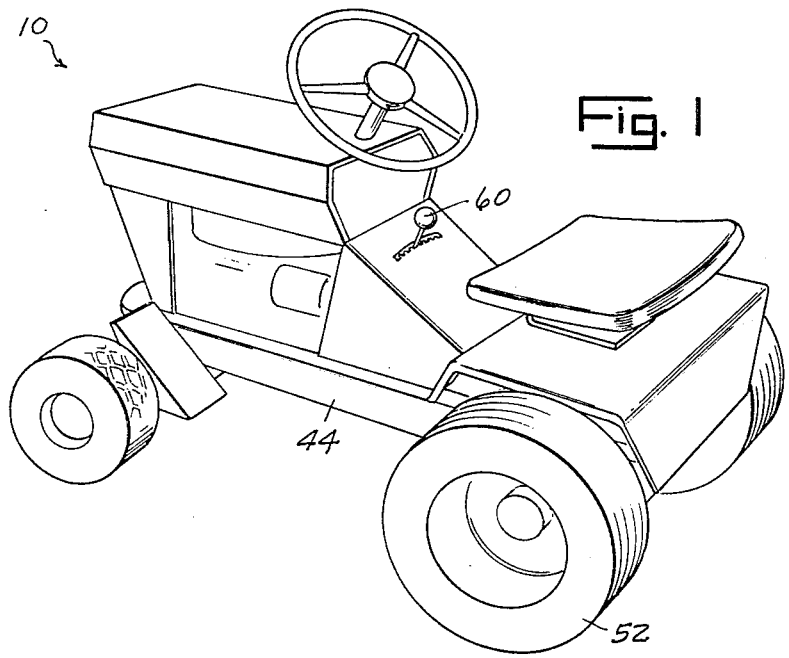
FIG. 1 is a perspective view of a friction drive vehicle.
Figure 2:
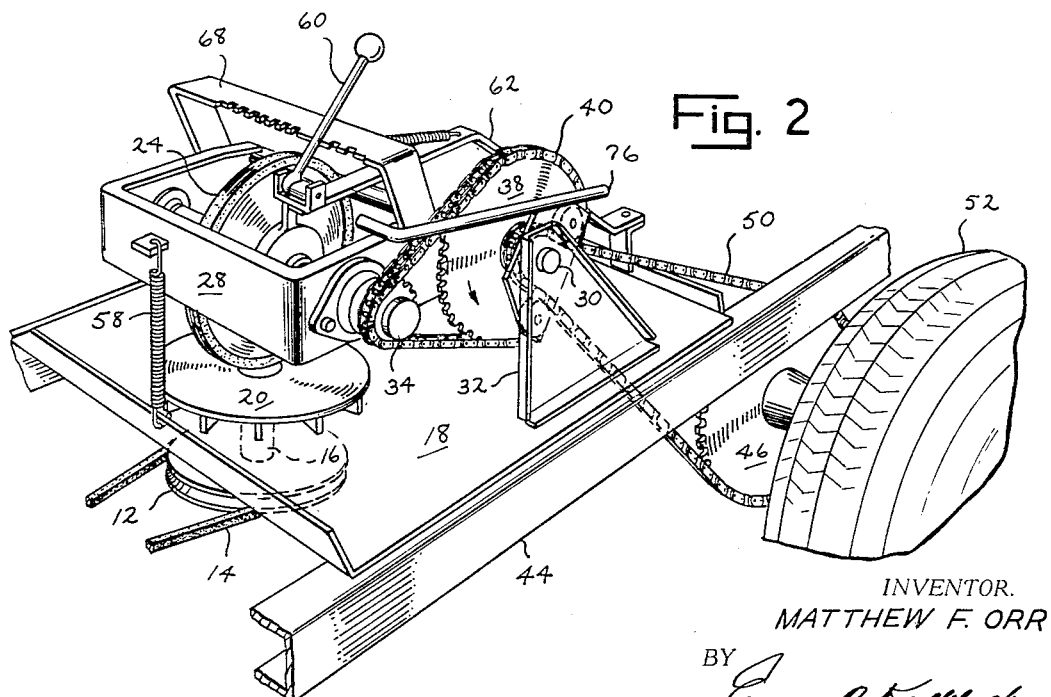
FIG. 2 is a fragmentary perspective view of the friction drive transmission of the vehicle in FIG. 1.

The preferred embodiment illustrated is not intended to be exhaustive or to limit the invention to the precise form disclosed. It is chosen and described in order to best explain the principles of the invention and the application and practical use to thereby enable other skilled in the art to best utilize the invention, and various embodiments and modifications thereof may be made as are best adapted to the particular use contemplated.

This invention pertains to a vehicle, such as a riding type lawn and garden tractor 10, having as its power source a gasoline engine (only the engine drive pulley 11 thereof being shown). Rotary power is transmitted from the engine to a driven pulley 12 by means of a drive belt 14. Pulley 12 preferably lies in a horizontal plane and is mounted upon a vertically extending shaft 16 which is journaled to a part 18 of the vehicle chassis. Shaft 16 fixedly mounts a substantially horizontal rigid concentric friction disk 20 at its upper end.

A vertically disposed friction wheel 22 which has a frictional tire 24 fixedly disposed about its outer circumference is adapted to bear on the top surface of disk 20. Wheel 22 is preferably mounted in a laterally slidable manner on a horizontal shaft 26. Shaft 26 preferably has a central portion of a non-circular configuration so as to be responsive to the rotation of wheel 22 and yet accommodate sliding of friction wheel 22 thereon. Shaft 26 is journaled to a support frame 28 and is normally positioned to be intersected by a projection of the axis of shaft 16. Support frame 28 is journaled or pivoted on a horizontally disposed shaft 30 whose axis is substantially parallel to and preferably rearwardly of shaft 26. Shaft 30 is journaled at its ends to side support brackets 32 carried by the vehicle chassis, as by member 18 thereof.

Attached to an extended end portion 34 of shaft 26 and keyed to rotate with the shaft is a driver sprocket or pulley 36. Aligned in the same vertical plane with driver sprocket 36 is a driven sprocket or pulley 38. Driven sprocket 38 is splined or secured upon horizontal shaft 30. Interconnecting the sprockets 36 and 38 for purposes of power transmission is a chain 40 or other flexible drive member. Shaft 30 also has splined thereto a driving sprocket or pulley 42. Mounted rearwardly of driving sprocket 42 and below vehicle frame member 44 is axle sprocket or pulley 46 which is fixedly attached to the axle 48 of wheel 52. A chain 50 or other flexible drive member interconnects driving sprocket or pulley 42 and axle sprocket or pulley 46, thereby completing the power transmitting means to the wheel axle.

In the manner common to riding type lawn and garden tractors and other vehicles having friction type drive transmissions, the speed and direction of travel of the vehicle is determined by the lateral displacement of the point of engagement of frictional wheel 22 from the center of disk 20. During operation of the engine of the tractor, friction disk 20 rotates in one direction and at a substantially constant speed. In its neutral position with no power being transmitted to wheels 52, friction wheel 22 rests with its tires 24 upon an idler plate 54 positioned in the center of friction disk 20. Idler plate 54 rests upon a bearing member 56 housed within a cutout centered in disk 20. With friction wheel 22 bearing upon idler plate 54, rotation of disk 20 occurs independently of the idler plate 54 which remains stationary. In this position, no rotary motion is transmitted to wheel 22. To vary the direction of vehicle movement, friction wheel 22 is moved along shaft 26 from one side to the other of friction disk 20, i.e. positioning of wheel 22 at one side of the disk 20 produces forward drive movement and positioning of wheel 22 at the other side of the center produces rearward movement. The vehicle speed is regulated by the radial spacing of the point of contact of the frictional wheel 22 from the center of friction disk 20.

Friction wheel 22 has an adjustable pivotal relationship with friction disk 20 because of the journaling of support frame 28 to shaft 30. A biasing spring 58 is attached between a vehicle chassis part, such as part 18, and the free end of frame 28, i.e. forwardly of shaft 26, and urges frictional wheel tire 24 into contact with friction disk 20. To provide a means for shifting friction wheel 22 along shaft 26 to vary the direction and speed of the tractor 10, a shaft stick 60 is pivotally mounted on the free end of an arm 62 which is pivoted to the vehicle frame at 63 and has attached thereto a yoke 64 connected to wheel 24 which rotates freely relative thereto. By urging stick 60 in its pivotal arc, yoke 64 causes friction wheel 22 to shift along shaft 26. Shift stick 60 may be locked into any one of a number of operative positions by seating it in a selected one of spaced cutouts 66 provided in a bracket 68 which is attached to support frame 28.

Associated with shaft 30 and journaled thereon is a pivot plate 70 positioned adjacent to flexible drive member 50 disposed rearwardly of shaft 30 and rotatably carried by pivotal plate 70 is an idler wheel 72 which is positioned outside of and normally engages one run 50' of chain or flexible drive member 50. A second idler wheel 74 is rotatably carried by pivotal plate 70 and is positioned outside of and adjacent to the other run 50'' of chain or flexible drive member 50. Idler wheels 72 and 74 are spaced from each other and from the pivot axis of plate 70 and are preferably journaled to pivotal plate 70 by nut and bolt means 78. Fixedly attached to the pivotal plate 70 and extending forwardly of shaft 30 is arm 76 which is so positioned that it is adapted to bear upon support frame 28 spaced from the pivot axis of pivot plate 70.

To explain the principle of operation of this invention, FIG. 6 is referred to. When vehicle 10 is caused to travel up an incline, traverse rough terrain, or experiences any other type of operating condition which places an increased load upon the vehicle drive, the run 50' of chain or flexible drive member 50 becomes substantially straightened due to an increase in tension while the run 50'' becomes relatively slack. This condition of the flexible drive member 50 causes a lifting of idler wheel 72 and a consequential pivotal movement of pivotal plate 70 to the position shown in FIG. 6. This pivotal movement of plate 70 in turn causes the downward movement of the free end of arm 76, causing it to forcibly press downwardly upon the pivoted support frame 28. This downward force, which is in addition to the biasing force of spring 58, causes friction wheel 22 to bear with an increased pressure upon friction disk 20. This additional pressure exerted during periods of increased load by friction wheel 22 upon disk 20 counters the tendency of the wheel to slip upon the disk due to the increased load.

During normal operation of the vehicle, as illustrated in FIG. 4, run 50' of chain 50 tends to assume a more slackened condition than under heavy load conditions, and chain run 50'' tends to assume a compensating condition. This operating condition of member 50 is transmitted by idler wheels 72, 74 to rotate the plate 70 from the FIG. 6 condition in a clockwise direction as viewed in FIG. 4. This clockwise rotation of plate 70 causes the lifting of the free end of arm 76 to reduce its pressure upon the frame 28, thus reducing the pressure exerted by the friction wheel 22 on disk 20, for example, to the pressure exerted by spring 58.

If, during reverse movement of vehicle 10, an increased load is experienced, run 50'' of chain or flexible drive member 50 will experience an increase in tension. This increased tension in run 50'' is transferred to the lower run 41 of chain or flexible drive member 40 causing friction wheel 22 to exert a greater pressure upon disk 20 without the need of assistance from arm 76. During this period of reverse movement of vehicle 10, idler wheel 72 is urged in a clockwise position as viewed in FIG. 4 thereby urging arm 76 into a pressure-free position above support frame 28.

By utilizing the teachings of this invention it can be seen that the frictional pressure between friction disk 20 and wheel 22 is varied proportionately in response to the load thereby reducing wear on frictional tire 24 and eliminating the need to provide continued heavy wheel pressure upon the disk.

It will be understod that the invention is not to be limited to the details herein given.

What I claim is:

1. A load responsive frictional vehicle drive transmission comprising a friction drive member rotating on one axis, a friction driven member engaging said friction drive member and rotatable on an axis angularly displaced from said one axis, adjustable means journaling one of said driving and driven members, a power output means, drive means connecting said friction driven member and said power output means and including an endless flexible drive member, and a shiftable member engaged by said flexible drive member and thereby responsive to variations of the tension of said flexible drive member, said shiftable member also engaging said adjustable means to vary the frictional driving force effective between said friction members.

2. A load responsive frictional vehicle drive transmission having a horizontal friction disk mounted upon the upper end of a substantially vertical rotating shaft, a friction wheel slidably mounted on a horizontal shaft journaled in a frame pivoted on a substantially horizontal axis above said friction disk, means normally urging said frame to cause said wheel to engage the upper surface of said friction disk, drive means including an endless flexible drive member connecting said friction wheel to a vehicle axle, said endless flexible drive member assuming different positions under variable tension in response to changes in vehicle load, a pivotal member engaging said endless drive means and pivoted as the position of said endless member varies responsive to varying tension of said drive means, said pivotal member engaging said pivoted friction wheel mounting frame whereby a variation in tension of said endless drive means causes a proportional variation of pressure upon said frame to the frictional force acting between said friction disk and friction wheel.

3. The load responsive frictional vehicle drive transmission of claim 2, wherein said pivotal member includes an arm engaging the top of the pivotal frame of said friction wheel spaced from the pivot axis thereof.

4. The load responsive frictional vehicle drive transmission of claim 2, wherein said pivotal member journals a rotatable member engaging a run of said endless drive member, whereby a variation of tension in said endless drive member pivots said pivotal member.

5. The load responsive frictional vehicle drive transmission of claim 2, wherein said pivotal member journals two idler wheels, spaced apart and engaging opposite runs of said endless drive member to be pivoted in response to variations in the tension of said runs, and said pivotal member includes an arm intermittently engaging the top of the pivotal frame of said friction wheel spaced from the pivot axis whereby variation in the tension of the runs of said endless drive member swings said arm and pivots said pivotal frame.

References Cited

UNITED STATES PATENTS 844,011  2/1907  Fischer _____ 74—197

A. HARRY LEVY, Primary Examiner

U.S. Cl. X.R.

74—197